United States Patent

Ogawa

Patent Number: 5,608,528
Date of Patent: Mar. 4, 1997

[54] OPTICAL POSITION DETECTING METHOD USING ASYNCHRONOUS MODULATION OF LIGHT SOURCE

[75] Inventor: Yasuji Ogawa, Otone-machi, Japan

[73] Assignee: Kabushikikaisha Wacom, Japan

[21] Appl. No.: 413,786

[22] Filed: Mar. 30, 1995

[30] Foreign Application Priority Data

Apr. 13, 1994 [JP] Japan .................................. 6-099344

[51] Int. Cl.$^6$ .................................................. G01B 11/14
[52] U.S. Cl. ........................ 356/375; 356/373; 250/203.1
[58] Field of Search ...................................... 356/373, 375, 356/376; 250/203.1, 221; 340/707; 33/DIG. 3, 503, 504, 554, 555, 556

[56] References Cited

U.S. PATENT DOCUMENTS

| | | | |
|---|---|---|---|
| 3,634,691 | 1/1972 | Bancroft | 250/203 |
| 4,549,078 | 10/1985 | Monahan | 250/203.1 |
| 5,440,392 | 8/1995 | Pettersen et al. | 356/375 |
| 5,484,966 | 1/1996 | Segen | 178/18 |

FOREIGN PATENT DOCUMENTS

6-59807  3/1994  Japan .

Primary Examiner—Frank Gonzalez
Assistant Examiner—Reginald A. Ratliff
Attorney, Agent, or Firm—Adams & Wilks

[57] ABSTRACT

In an optical position detecting method, a light beam is intensity-modulated with a given periodic waveform, and is then emitted from an object light source. An image sensor captures an image of the light source and stores corresponding image data per pixel. Subsequently, the image sensor is accessed successively at least four times at a pitch which is less than ¼ of that of the periodic waveform, so as to read the image data per pixel to form a time-sequential data. Subsequently, a scalar product computation of the time-sequential data is executed using a reference waveform which is asynchronous with the periodic waveform while having a period relatively close to the period of the periodic waveform, so as to derive first scalar data. Another scalar product computation of the time-sequential data is further executed using an orthogonal waveform which is out of phase by 90° relative to the reference waveform, so as to derive second scalar data. Finally, an image processing is performed using the first and second scalar data so as to extract a position of the light source.

4 Claims, 5 Drawing Sheets

FIG. 7

OPTICAL POSITION DETECTING METHOD USING ASYNCHRONOUS MODULATION OF LIGHT SOURCE

BACKGROUND OF THE INVENTION

1. Field of the Invention

The present invention relates to an optical position detecting method, wherein an image of a light source as an object to be measured is captured by an image sensor so as to measure a position of the light source. More specifically, the present invention relates to a technique for removing noise which is caused by ambient sunlight, illumination light and the like when performing such an optical measurement.

2. Description of the Prior Art

Optical position detecting methods have been known in the art, wherein an image of a light source as an object to be measured is captured by an image sensor so as to measure a position of the light source, for example as disclosed in Japanese First (unexamined) Patent Publication No. 6-59807. In this publication, a position control of a cursor displayed on the display of a computer is performed using a light pointer. Specifically, a point light source incorporated in the light pointer is captured by the image sensor incorporated in the computer body so as to extract a position of the point light source by performing the image processing. Based on the extraction result, the cursor position is controlled. The disclosed optical position detecting method has also been utilized in a survey in the civil engineering field and so on, other than the light pointer and the like which are operated inside a room. Specifically, the survey is performed by setting a position indicator including therein a point light source, such as, LED, at a measurement site and by capturing an image of the position indicator using a television camera or the like at a distant place.

In the position measurement using a light beam as a measuring medium, it is necessary to remove noise factors caused by ambient light, such as, the sunlight and the interior illumination light. Particularly, when a distance between the light source and the image sensor is increased, intensity of the light emitted from the light source is weakened, and thus, intensity of the ambient light is relatively increased so that the precise position measurement is impeded. In view of this, various countermeasures have been taken for removing noise. For example, by subtracting from an active image data obtained by capturing the light source in a light-on state a passive image data obtained by capturing the light source in a light-off state, a net signal component is extracted so as to eliminate the influence of the ambient light. However, in such a conventional method, since it is necessary to synchronize light-on and light-off timings at a side of the light source with image capturing timings at a side of the image sensor, the structure inevitably becomes complicated. For example, a cable becomes necessary for synchronizing the foregoing timings, which further makes it difficult to realize a wireless structure at the remote site of the light source. In case of the light pointer, for example, since the wireless light pointer is difficult to realize, the wired light pointer seriously spoils maneuverability of the light pointer.

SUMMARY OF THE INVENTION

In view of the foregoing problem in the conventional technique, it is an object of the present invention to remove noise without requiring the foregoing conventional synchronization of the associated elements so as to realize a wireless structure in an optical position detecting method. It is a further object of the present invention to enable additional data to be transmitted in addition to positional data using the above-noted noise removing technique.

In order to accomplish the foregoing objects, an optical position detecting method which captures an image of a light source as an object using an image sensor so as to measure a position of the light source performs the following steps:

First, a light emitting step is performed for emitting light from the light source, wherein the light is intensity-modulated with a given periodic waveform. Subsequently, an image capturing step is performed for receiving the light by the image sensor to capture the light source in sequence so as to store corresponding image data per pixel. Subsequently, a reading step is performed for accessing the image sensor successively at least four times at a pitch which is less than ¼ of a period of the periodic waveform, so as to read the image data per pixel to form a time-sequential data. Subsequently, a calculation step is performed for executing a scalar product computation of the time-sequential data using a reference waveform which is asynchronous with the periodic waveform while having a period relatively close to the period of the periodic waveform, so as to derive a first noise-removed scalar data. Subsequently, another calculation step is performed for executing a scalar product computation of the time-sequential data using an orthogonal waveform which is out of phase by 90° relative to the reference waveform, so as to derive a second noise-removed scalar data. Finally, a processing step is performed for executing an image processing using the first and second scalar data derived per pixel, so as to extract a position of the light source.

Preferably, the light emitting step may change the period of the periodic waveform according to a given additional data. Further, phases of the periodic waveform may be derived at different sampling timings based on the first and second scalar data so as to derive the changed period of the periodic waveform based on a time-dependent variation of the phase of the periodic waveform to extract the additional data.

In the optical position detecting method according to the present invention, the light emitted from the light source is intensity-modulated (amplitude modulation) using the given periodic waveform. On the other hand, at a side of the image sensor, the image data is read out in sequence per proper frame period to form the time-sequential or time series data corresponding to the intensity-modulated light. At this time, the scalar product computation of the time series data is executed using the given reference waveform for selectively extracting (filtering) only a modulated component contained in the emitted light so as to remove noise. The reference waveform used in the scalar product computation is asynchronous with the periodic waveform used in the amplitude modulation while having the period close or comparable to that of the periodic waveform. Accordingly, the detection of the modulated component contained in the emitted light is performed in the so-called heterodyne or homodyne manner. Since the periodic waveform used at a side of the light source and the reference waveform used at a side of the image sensor are asynchronous with each other, synchronization therebetween is naturally not required so that the wireless structure can be easily realized.

The scalar product computation utilizes a pair of the reference waveform and the orthogonal waveform which are out of phase by 90° with each other. Accordingly, not only the amplitude of the modulated component contained in the emitted light, but also the phase thereof can be detected.

Therefore, by calculating a variation between the phases extracted at different sampling timings, the period of the modulated component contained in the emitted light can also be detected. Accordingly, by changing the period of the periodic waveform based on the additional data accompanying the positional data, the data other than the positional additional data can also be transmitted.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Figure 1:
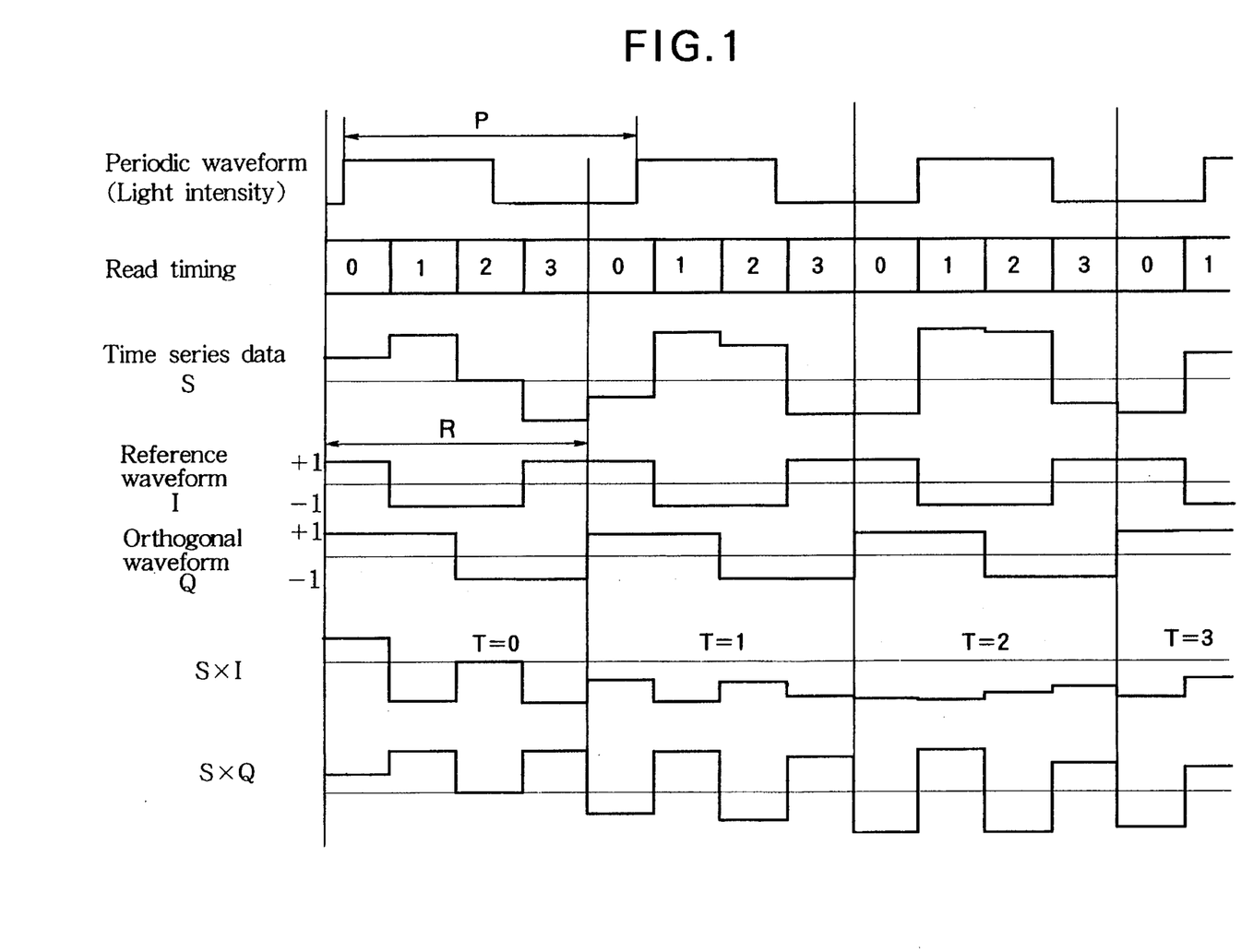
FIG. 1 is a timing chart showing an optical position detecting method according to a preferred embodiment of the present invention.
Figure 2:
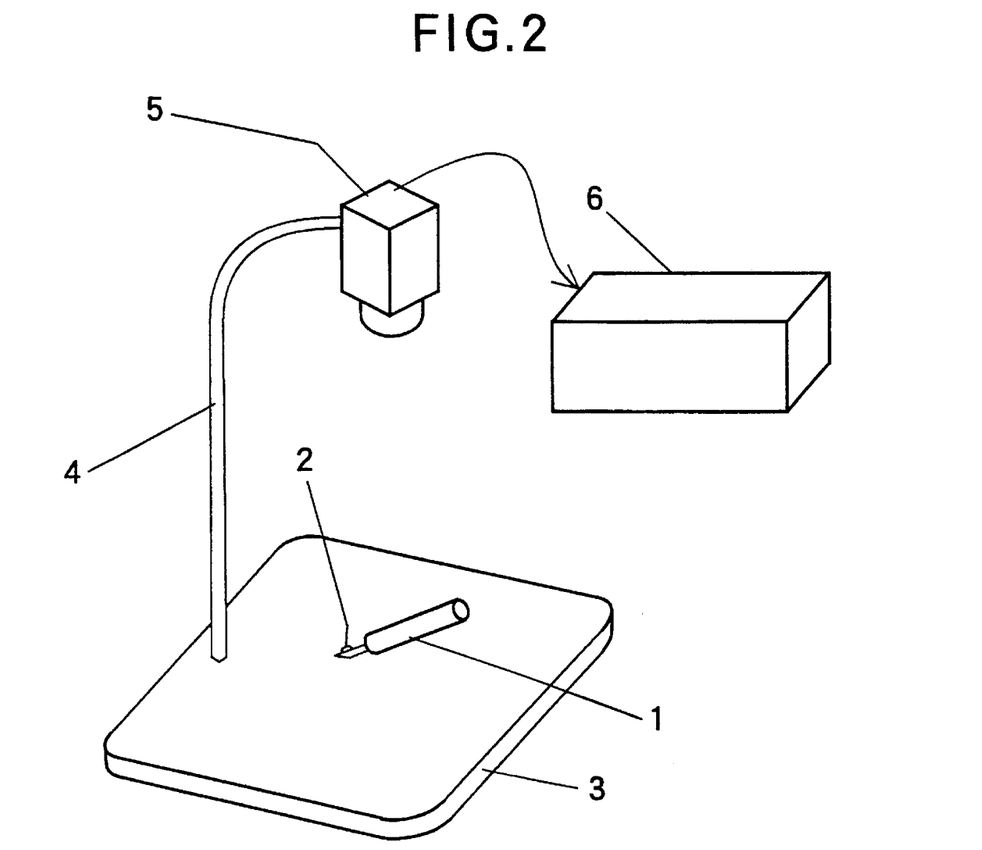
FIG. 2 is a diagram schematically showing a structure of an optical digitizer to which the optical position detecting method of the preferred embodiment is applied.

Before describing an optical position detecting method according to a preferred embodiment of the present invention with reference to FIG. 1, a structure of an optical or light digitizer which is one example to be applied with the present invention will be first described with reference to FIG. 2 for facilitating better understanding of the preferred embodiment. As shown in FIG. 2, a coordinate input operation into the light digitizer is performed using a wireless light stylus 1. The light stylus 1 includes an LED 2 as a light source at its tip (pen point). The input of (X,Y) coordinates is performed by manually handling the light stylus 1 along a surface of a pad 3. The (X,Y) coordinates are given as positional data of the LED 2. In this preferred embodiment, stylus pressure data can also be inputted into the light digitizer in addition to the positional data. It may also be arranged that switch data can also be inputted.

A television camera 5 is provided above the pad 3 as being supported by a stand 4. The television camera 5 is incorporated with an image sensor formed of a two-dimensional image pickup element, such as, CCD. The television camera 5 captures an image of the LED 2 and outputs corresponding image data. The outputted image data are transferred to an image processing unit 6 where a position of the LED 2 is extracted.

Figure 3:
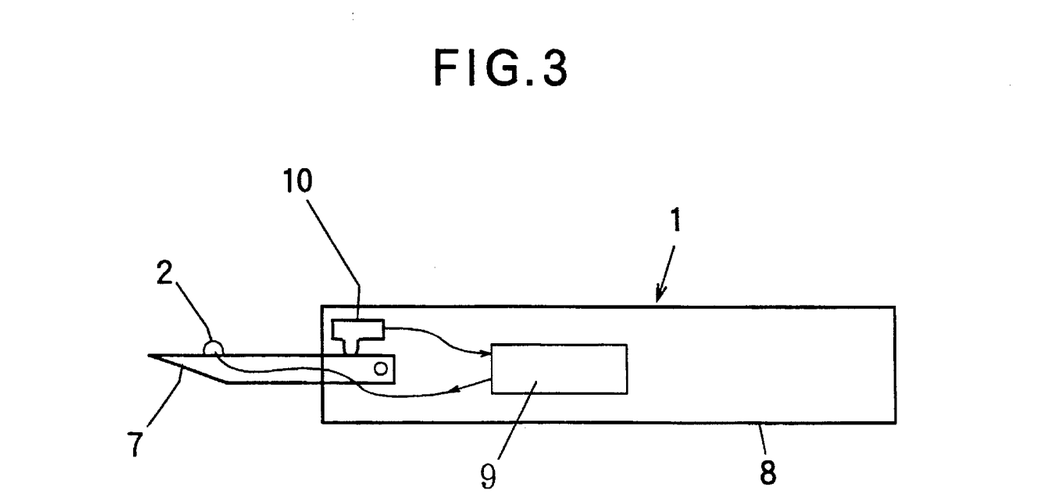
FIG. 3 is a schematic sectional diagram showing a structure of a optical or light stylus used in the light digitizer shown in FIG. 2.

FIG. 3 is a schematic sectional diagram showing a structure of the light stylus 1 shown in FIG. 2. As best shown in FIG. 3, the LED 2 is mounted to the pen point 7 of the light stylus 1 as a light source. In a pen stem 8 of the light stylus 1, an oscillator 9 is incorporated for controlling the LED 2 to emit a light beam which is intensity-modulated by a given periodic waveform. Further, a tool force detector 10 is incorporated in the pen stem 8 for changing a frequency of the oscillator 9 depending on a force or pressure applied to the pen point 7. Accordingly, the oscillator 9 is of a type which can vary its oscillating frequency. In this preferred embodiment, the stylus pressure data is given as an additional data accompanying the positional data. However, the present invention is not limited to this. For example, the switch data, such as, touchdown of the pen point 7 may be given as accompanying additional data.

Now, the optical position detecting method performed in the light digitizer shown in FIG. 2 will be described in detail with reference to a timing chart of FIG. 1. In this preferred embodiment, a square or rectangular wave with a duty ratio of 50% is used as the periodic waveform to modulate the light emitted from the LED. A period P of the rectangular wave is changed depending on the tool force. Further, the light intensity is modulated periodically according to the rectangular wave.

On the other hand, at a side of the television camera 5, the built-in image sensor receives the light beam to capture an image of the LED 2 at a side of the light stylus 1 and stores the corresponding image data a pixel by pixel. The stored image data is read out at a given frame period. In the present invention, the image sensor is accessed successively at least four times at an interval or pitch which is less than ¼ of the period P of the periodic waveform of the emitted light, so as to read the image data per pixel to form a time-sequential data or time series data. In this preferred embodiment, the image data is read successively just four times to obtain the time series data S.

Subsequently, a multiplying process is performed between a reference waveform I and the time series data S so as to obtain a first product data (S×I). As shown in FIG. 1, the reference waveform I is a rectangular waveform like the periodic waveform used for the intensity modulation. However, the reference waveform I varies between +1 level and −1 level and includes no DC component. Further, the reference waveform I and the periodic waveform are asynchronous with each other, while a period R of the reference waveform I is set to a value which is relatively close or comparable to the period P of the periodic waveform. As appreciated from the timing chart, the time series data S of one unit, which are read out successively four times, correspond to the period R of the reference waveform I. In this preferred embodiment, sampling of the time series data S is performed repeatedly four times within the frame period R. A first sampling cycle is represented by T=0, a second sampling cycle by T=1, and then by T=2, T=3, . . . , in the order named.

Another multiplying process is further performed between the time series data S and an orthogonal waveform Q which is out of phase by 90° relative to the reference waveform I, so as to obtain a second product data (S×Q). The first product data (S×I) includes one component of the orthogonally-decomposed time series data S, and the second product data (S×Q) includes the other component. By summing the first product data (S×I) over the period R of the reference waveform I, a first scalar data free of noise is obtained. By summing the second product data (S×Q) over the period R of the reference waveform I, a second scalar data free of noise is obtained. In the first product data (S×I), the beat appears according to a frequency difference between the reference signal I and the periodic signal, and an amplitude of the first product data changes gradually per sampling cycle T. On the other hand, the beat also appears in the second product data (S×Q), and an amplitude thereof is gradually shifted between sampling cycles in a complementary relationship to the first product data (S×I).

Figure 4:
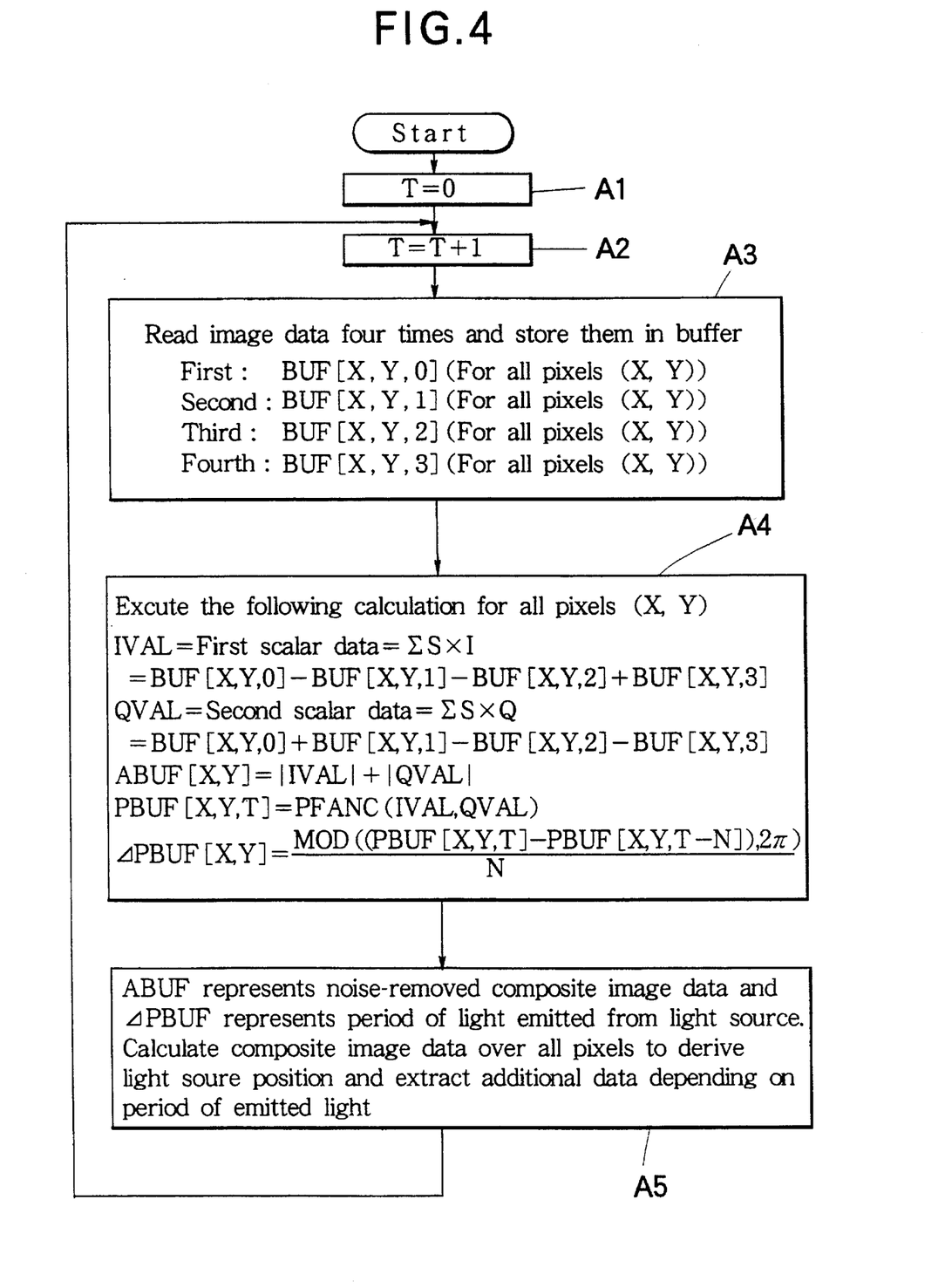
FIG. 4 is a flowchart showing a calculation process routine to be executed in the optical position detecting method according to the preferred embodiment.

Now, a calculation process executed in the optical position detecting method in this preferred embodiment will be described hereinbelow in detail with reference to a flowchart shown in FIG. 4. After starting a routine of the calculation process, a sampling cycle T is set to 0 at step A1. The sampling cycle T corresponds to the period R of the reference waveform I and further corresponds to one cycle of the calculation process routine. Subsequently, at step A2, T is incremented by 1 every time one cycle of the calculation process routine is finished. Then at step A3, the image data is read out successively four times per pixel and stored in a buffer. The image data read out at a first time for all the pixels (X,Y) are represented by BUF[X,Y,0]. Similarly, the image data read out at a second time are represented by BUF[X,Y,1], the image data read out at a third time are represented by BUF[X,Y,2], and the image data read out at a fourth time are represented by BUF[X,Y,3]. In this manner, the time series data S shown in FIG. 1 are obtained in a pixel by pixel basis.

Subsequently, at step A4, a scalar product computation of the time series data S is performed for all the pixels (X,Y). By means of the scalar product computation using the reference waveform I, the first scalar data IVAL is obtained. Specifically, IVAL is obtained by calculating:

$$BUF[X,Y,0]-BUF[X,Y,1]-BUF[X,Y,2]+BUF[X,Y,3]$$

In other words, signs of the time series data S are changed according to polarity changes of the reference waveform I (multiplying), and the sum of them is derived (adding). By subtracting the sum of BUF[X,Y,1] and BUF[X,Y,2] from the sum of BUF[X,Y,0] and BUF[X,Y,3], the noise factors are canceled and eliminated, and one component of the orthogonally-decomposed time series data S is obtained. Similarly, by means of the other scalar product computation of the time series data S using the orthogonal waveform Q, the second scalar data QVAL is obtained. QVAL is obtained by calculating:

$$BUF[X,Y,0]+BUF[X,Y,1]-BUF[X,Y,2]-BUF[X,Y,3]$$

The noise factors are also eliminated in the second scalar data QVAL, and the other component of the orthogonally-decomposed time series data S is included.

Subsequently, the absolute values of IVAL and QVAL are summed to derive ABUF[X,Y]. When the rectangular wave is used for those of the periodic waveform, the reference waveform I and the orthogonal waveform Q, the intensity (amplitude) of the composite image data can be obtained by simply summing the absolute values of the first scalar data and the second scalar data, as represented by ABUF[X,Y]. On the other hand, when sine wave is used as the modulating waveform, the intensity of the composite image data is derived by summing a square of the first scalar data and a square of the second scalar data and by obtaining a square root of the sum.

Further, the following calculation is executed:

$$PBUF[X,Y,T]=PFANC(IVAL,QVAL)$$

PFANC is a function of IVAL and QVAL and represents a phase of the periodic waveform at a sampling cycle T. As described before, the reference waveform I and the periodic waveform are asynchronous with each other and differ in period from each other. Accordingly, the phase of the periodic waveform is gradually shifted at each sampling cycle relative to the reference waveform I. An amount of this shift increases as a difference between the period R of the reference waveform I and the period P of the periodic waveform becomes greater. In other words, the period P of the periodic waveform can be derived based on time-dependent variations of the phase PBUF[X,Y,T] of the periodic waveform derived at different sampling cycles. Specifically, the following calculation is performed:

$$\Delta PBUF[X,Y]=MOD((PBUF[X,Y,T]-PBUF[X,Y,T-N]),2\pi)/N$$

wherein MOD is a remainder operator and N is a preset constant.

As appreciated from the above equation, the constant N represents an interval between different sampling cycles T and T–N. A value of a bracketed term of MOD represents a time-domain variation (shift) between the phases PBUF derived at the respective sampling cycles T and T–N, wherein a net shift amount less than $2\pi$ is extracted. By dividing this shift amount by N, the period P of the periodic waveform is given as $\Delta PBUF[X,Y]$.

Finally at step A5, based on the data obtained by the foregoing calculation processes, positional data of the light source and accompanying additional data are extracted. As described before, ABUF represents the noise-removed composite image data and $\Delta PBUF$ represents the period of the modulated component contained in the light emitted from the light source. By executing image processing of the composite image data ABUF over all the pixels, a light source position can be derived from the image captured by the image sensor according to the normal image processing. Further, based on $\Delta PBUF$, the additional data depending on the period of the modulated component in the emitted light is extracted. When one cycle of the calculation process routine over steps A3 to A5 is finished, the routine returns to step A2 to execute a calculation process cycle corresponding to the next sampling cycle.

Figure 5:
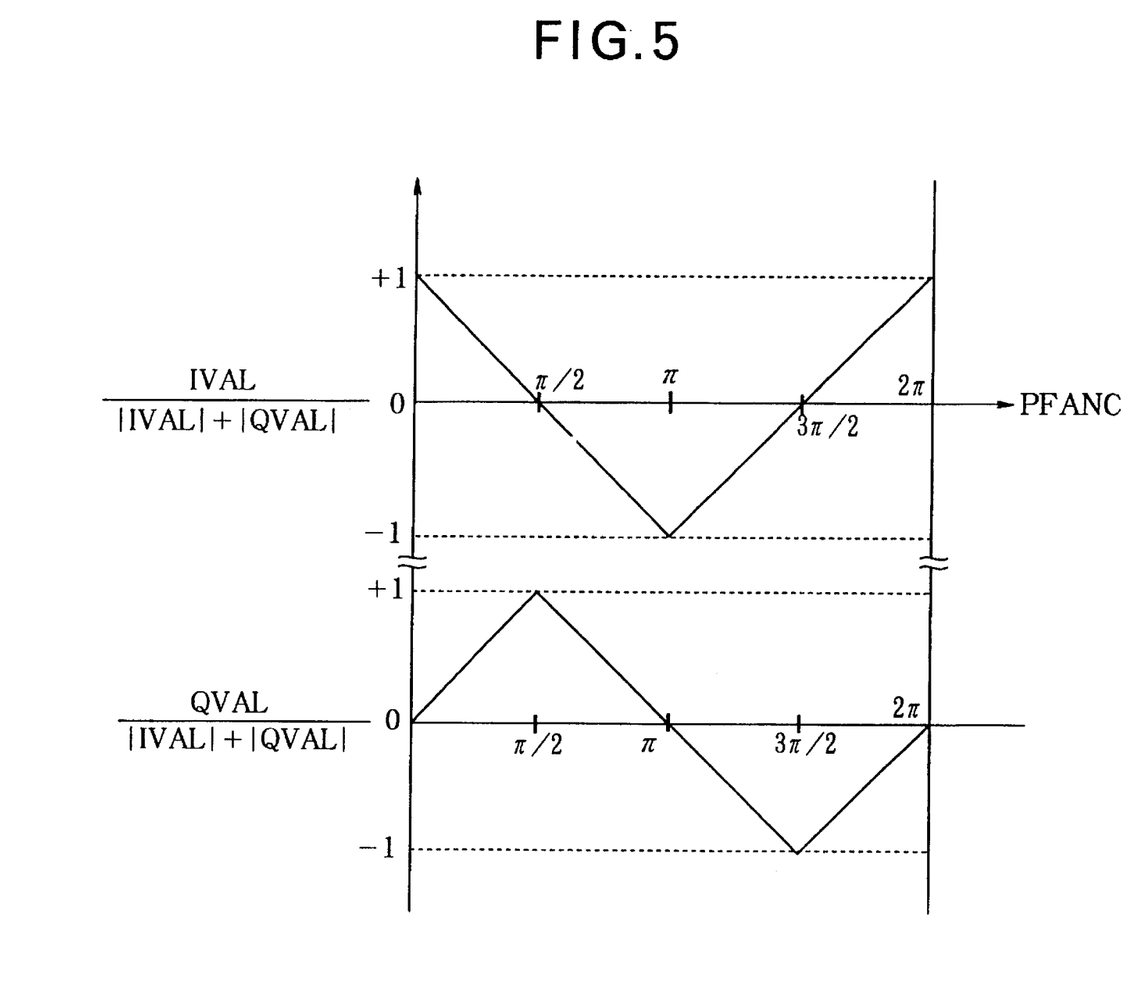
FIG. 5 is a diagram for explaining a function PFANC used in the calculation process routine shown in FIG. 4.

FIG. 5 is a diagram for explaining PFANC used at step A4 in the foregoing flowchart. As described before, PFANC represents the phase of the periodic waveform and is the function of IVAL and QVAL. Specifically, as shown in the diagram of FIG. 5, PFANC is in a linear relationship to IVAL/(|IVAL|+|QVAL|). Specifically, when the rectangular wave is used, the phase of the periodic waveform is in a linear relationship to a ratio of the first scalar data relative to the sum of the absolute values of the first and second scalar data. However, as appreciated from the diagram, only with values of IVAL/(|IVAL|+|QVAL|), values of PFANC can not be discriminated between a range of 0 through $\pi/2$ and a range of $3\pi/2$ through $2\pi$, and similarly between a range of $\pi/2$ through $\pi$ and a range of $\pi$ through $3\pi/2$. In view of this, when determining the values of PFANC, the value of QVAL/(|IVAL|+|QVAL|) is also referred to. In this manner, the phase of the periodic waveform can be derived univocally based on the first scalar data and the second scalar data.

Figure 6:
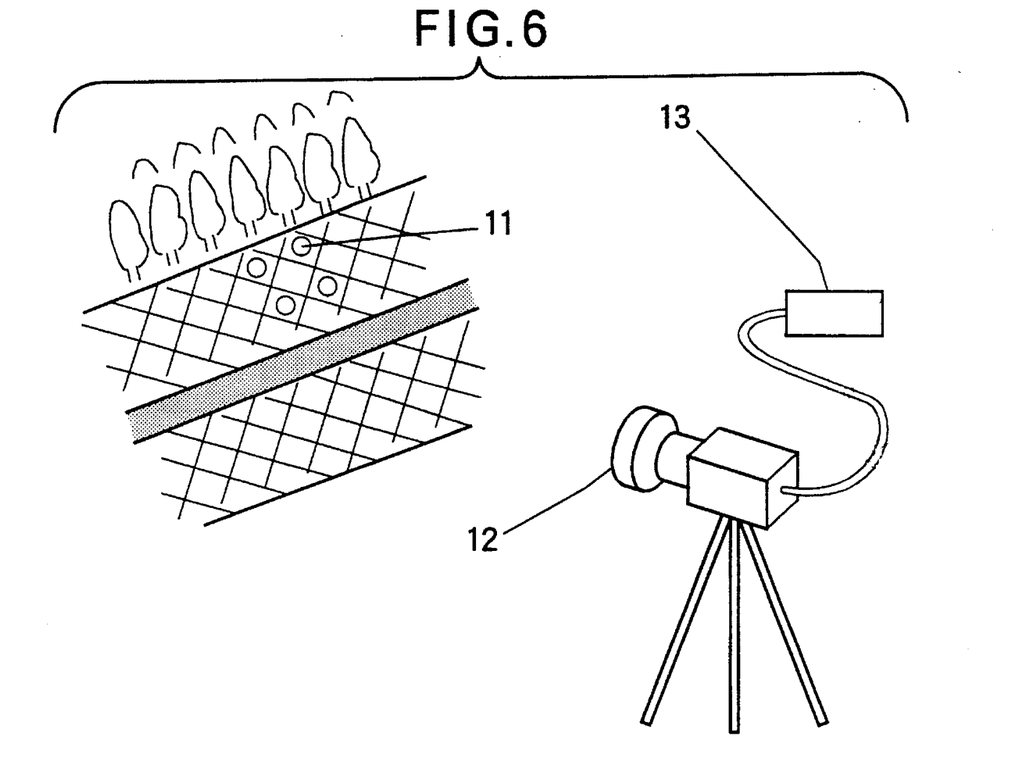
FIG. 6 is a diagram schematically showing a civil engineering survey system to which the optical position detecting method according to the preferred embodiment is applied.

FIG. 6 shows another example to which the optical position detecting method according to the preferred embodiment is applied. In this example, the civil engineering survey is performed using a plurality of position indicators 11 and a television camera 12. Each of the position indicators 11 is provided with a light source. The position indicators 11 are set on a slant surface of a mountain selected to be measured at proper intervals. On the other hand, the television camera 12 is arranged at a place distant from the slant surface of the mountain. The television camera 12 captures images of the position indicators 11 and derives positions of the respective position indicators 11 by means of the image process. For this, an image processing unit 13 is connected to the television camera 12. By observing the respective positions of the position indicators 11 by the television camera in a time-domain manner, the behavior of the ground can be monitored. Since the position indicators 11 are arranged distant from the television camera 12, the intensity of the received light emitted from the light source is relatively low. For this reason, it is essential to remove the noise factors, such as, the sunlight, and the foregoing noise removing technique is significantly effective for this. Particularly, since the noise can be removed without requiring the synchronization in operation between the position indicators 11 and the television camera 12, it is quite practical.

Figure 7:
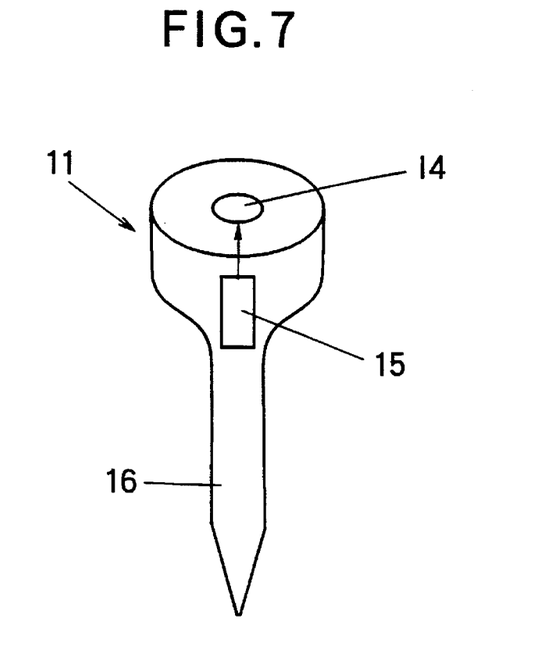
FIG. 7 is a diagram schematically showing a structure of a position indicator used in the civil engineering survey system shown in FIG. 6.

FIG. 7 is a diagram showing a structure of the position indicator 11 shown in FIG. 6. In FIG. 7, an LED 14 as a light source is incorporated in the position indicator 11 at its top. Further, an oscillator 15 is incorporated inside the position indicator 11 for controlling the LED 14 to emit the light which is intensity-modulated with the given periodic waveform. The oscillators 15 have different oscillating frequencies for the respective position indicators 11. Accordingly, the light beams emitted from the respective position indicators 11 are intensity-modulated at different periods from each other. The light receiving unit detects the respective different modulation periods of the emitted lights based on the foregoing method. Accordingly, the position indicators 11 can be distinguished from each other to perform two-dimensional monitoring of the ground behavior with high accuracy. As shown in FIG. 7, each position indicator 11 has a root portion 16 for stably fixing the position indicator 11 relative to the object to be measured, such as, the slant surface of the mountain.

As described above, according to the foregoing preferred embodiment, the position of the light source can be optically measured with the noise factors being removed, while the light source side and the image sensor side are allowed to be asynchronous in operation with each other. Accordingly, when the optical position detecting method of the foregoing preferred embodiment is applied, for example, to the optical digitizer, the wireless structure of the stylus can be very easily realized so that the maneuverability thereof is highly improved. Further, when applied to, such as, the civil engineering survey, since the noise can be eliminated while the position indicators and the television camera are asynchronous in operation with each other, the overall structure of the civil engineering survey system can be simplified. Further, by changing the period of the periodic waveform used in intensity modulation of the light emitted from the light source according to a desired additional data, various kinds of data other than the positional data can also be transmitted. For example, when this technique is applied to the light stylus in the manual input system, it is easy to transmit the tool force data, the stylus touchdown data and the like. Further, when applied to the civil engineering survey system, it is possible to transfer the identification data for discriminating individual position indicators.

It is to be understood that this invention is not to be limited to the preferred embodiments and modifications described above, and that various changes and modifications may be made without departing from the spirit and scope of the invention as defined in the appended claims.

What is claimed is:

1. An optical position detecting method which captures an image of a light source as an object by using an image sensor so as to measure a position of the light source, said method comprising:

a light emitting step for emitting a light beam from said light source, said light beam being intensity-modulated by a given periodic waveform;

an image capturing step for receiving said light beam by the image sensor to capture said light source so as to store a corresponding image data pixel by pixel;

a reading step for accessing the image sensor successively at least four times at a pitch which is less than ¼ of a period of said periodic waveform, so as to sequentially read the image data to form a time-sequential data;

a calculation step for executing a scalar product computation of said time-sequential data with a reference waveform which is asynchronous to said periodic waveform while having a period comparable to the period of said periodic waveform, so as to derive a first scalar data free of noise;

another calculation step for executing a scalar product computation of said time-sequential data with an orthogonal waveform which is out of phase by 90° relative to said reference waveform, so as to derive a second scalar data free of noise; and a processing step for executing image processing according to said first and second scalar data derived pixel by pixel, so as to extract the position of said light source.

2. The optical position detecting method as set forth in claim 1, wherein said light emitting step modulates the period of said periodic waveform according to given additional information, and wherein an additional calculation step is further carried out for deriving phases of said periodic waveform at different sampling timings based on said first and second scalar data so as to derive the modulated period of said periodic waveform based on a time-variation of the phase of said periodic waveform to extract said additional information.

3. An optical position detecting apparatus which captures an image of a light source as an object so as to measure a position of the light source, said apparatus comprising:

light emitting means disposed in the object for emitting a light beam from said light source, said light beam being intensity-modulated by a given periodic waveform;

an image sensor spaced apart from the object for receiving said light beam to capture said light source so as to store a corresponding image data pixel by pixel;

reading means for accessing the image sensor successively at least four times at a pitch which is less than ¼ of a period of said periodic waveform, so as to sequentially read the image data to form a time-sequential data;

first calculation means for executing a scalar product computation of said time-sequential data with a reference waveform which is asynchronous to said periodic waveform while having a period comparable to the period of said periodic waveform, so as to derive a first scalar data free of noise;

second calculation means for executing a scalar product computation of said time-sequential data with an orthogonal waveform which is out of phase by 90° relative to said reference waveform, so as to derive a second scalar data free of noise; and processing means for executing image processing according to said first and second scalar data derived pixel by pixel, so as to extract the position of said light source.

4. The optical position detecting apparatus as set forth in claim 3, wherein said light emitting means includes means for modulating the period of said periodic waveform according to given additional information, and wherein additional calculation means is further provided for deriving phases of said periodic waveform at different sampling timings based on said first and second scalar data so as to derive the modulated period of said periodic waveform based on a time-variation of the phase of said periodic waveform to extract said additional information.

\* \* \* \* \*